United States Patent
Goyal (10) Patent No.: US 8,543,135 B2
(45) Date of Patent: Sep. 24, 2013

(54) CONTEXTUALLY AWARE MOBILE DEVICE

(76) Inventor: Amit Goyal, Stone Mountain, GA (US)

(*) Notice: Subject to any disclaimer, the term of this patent is extended or adjusted under 35 U.S.C. 154(b) by 0 days.

(21) Appl. No.: 13/469,254

(22) Filed: May 11, 2012

(65) Prior Publication Data
US 2012/0289244 A1 Nov. 15, 2012

Related U.S. Application Data

(60) Provisional application No. 61/485,164, filed on May 12, 2011, provisional application No. 61/546,361, filed on Oct. 12, 2011, provisional application No. 61/580,635, filed on Dec. 27, 2011.

(51) Int. Cl.
| | |
|---|---|
| H04W 24/00 | (2009.01) |
| H04B 1/06 | (2006.01) |
| H05K 11/00 | (2006.01) |
| H05K 11/02 | (2006.01) |
| H04M 1/00 | (2006.01) |
| G08B 21/00 | (2006.01) |
| G01P 15/00 | (2006.01) |
| H04B 1/38 | (2006.01) |

(52) U.S. Cl.
USPC ...... 455/456.1; 455/344; 455/345; 455/550.1; 455/556.1; 455/574; 340/669; 702/141

(58) Field of Classification Search
USPC ............ 455/456.1–457, 440, 404.1–404.2, 455/569.2, 414.1–414.4; 701/116–120, 400–541; 340/463–467, 669–671, 907–932.1
See application file for complete search history.

(56) References Cited

U.S. PATENT DOCUMENTS

| | | | |
|---|---|---|---|
| 8,065,508 B2 | 11/2011 | Rubin et al. | |
| 2007/0027583 A1* | 2/2007 | Tamir et al. | 701/1 |
| 2008/0125959 A1* | 5/2008 | Doherty et al. | 701/200 |
| 2008/0299959 A1* | 12/2008 | Geyer et al. | 455/418 |
| 2009/0192688 A1* | 7/2009 | Padmanabhan et al. | 701/70 |
| 2010/0204877 A1* | 8/2010 | Schwartz | 701/33 |
| 2011/0143775 A1* | 6/2011 | Liu et al. | 455/456.3 |

* cited by examiner

Primary Examiner — Marisol Figueroa
Assistant Examiner — Erica Navar (57) ABSTRACT

A method for determining if a mobile device is in a vehicle includes monitoring an acceleration of the mobile device for a time interval during a period of time. The method also includes calculating one or more characteristics of the acceleration of the mobile device during the time interval and comparing the one or more characteristics of the acceleration to a set of threshold values. The method further includes determining the state of the mobile device based on the comparison of the one or more characteristics of the acceleration to the set of threshold values, wherein the state of the mobile device includes an in-vehicle state, a non-vehicle state.

20 Claims, 6 Drawing Sheets

CONTEXTUALLY AWARE MOBILE DEVICE

CROSS REFERENCE TO RELATED APPLICATIONS

This application claims priority to U.S. Provisional Application Ser. No. 61/485,164 filed May 12, 2011; Ser. No. 61/546,361 filed Oct. 12, 2011; and Ser. No. 61/580,635 filed Dec. 27, 2011.

BACKGROUND

The present invention relates to systems and methods for determining the context of a mobile device, and more particularly is related to determining the context of a mobile device in an energy efficient manner.

Various attempts at developing applications to determine the context of a mobile device have been previously made. Generally, the context of the mobile device can include whether the mobile device is stationary or in motion and if the mobile device is in motion if the mobile device is located inside a vehicle.

Determining if a mobile device is inside of a vehicle is of particular value for a wide array of mobile applications. Some applications that would benefit from accurate context awareness include the ability to change the state of phone to prevent unfavorable user behavior like texting while driving. Another application may be configured to determine vehicle congestion and communicate that information to a traffic server. Yet another sample application would change the state of the phone into "driver mode" that would make certain functions more easily accessible while others could be less easily accessible.

To date, most methods for determining that a mobile device is in a vehicle have been through the use of location technologies such as GPS, A-GPS, Wifi Position System (WPS), and cellular phone tower triangulation. Using location based technologies to determine mobile device context has numerous drawbacks. For example, determining the speed and location of the device in this manner has bandwidth, power, and privacy implications. In addition, certain vehicle situations such as a vehicle inside a city become substantially more difficult to identify since the vehicle does not travel very far within a fixed amount of time.

Furthermore, power is a major resource constraint in mobile devices. In situations where the mobile device is not able to be easily charged, the device must rely on a battery, which is a limited power source. Continuously determining a mobile device's location and speed using a power intensive technology, such as GPS, greatly reduces the battery life of the mobile device. In addition, calculating speed and transmitting location data wastes energy and bandwidth.

SUMMARY

An exemplary embodiment includes a method for determining if a mobile device is in a vehicle includes monitoring an acceleration of the mobile device for a time interval during a period of time. The method also includes calculating one or more characteristics of the acceleration of the mobile device during the time interval and comparing the one or more characteristics of the acceleration to a set of threshold values. The method further includes determining the state of the mobile device based on the comparison of the one or more characteristics of the acceleration to the set of threshold values, wherein the state of the mobile device includes an in-vehicle state, a non-vehicle state.

An additional exemplary embodiment includes a method for determining a location of user associated with a mobile device. The method includes monitoring an acceleration of the mobile device for a time interval during a period of time and calculating one or more characteristics of the acceleration of the mobile device during the time interval. The method also includes comparing the one or more characteristics of the acceleration to a set of threshold values and determining the state of the mobile device based on the comparison of the one or more characteristics of the acceleration to the set of threshold values, wherein the state of the mobile device includes an in-motion state, an in-vehicle state and a stationary state. Based on determining a change of the state of the mobile device, the method includes calculating and updating the location of the mobile device.

A further exemplary embodiment includes a method for determining if a mobile device is in a vehicle. The method includes monitoring an acceleration and a rotation of the mobile device for a time interval during a period of time and comparing the acceleration and the rotation of the mobile device to a set of threshold values. The method also includes determining a state of the mobile device based on the comparison of the acceleration and the rotation to the set of threshold values, wherein the state of the mobile device includes an in-vehicle state, a non-vehicle state, a stationary state, and a traffic state.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
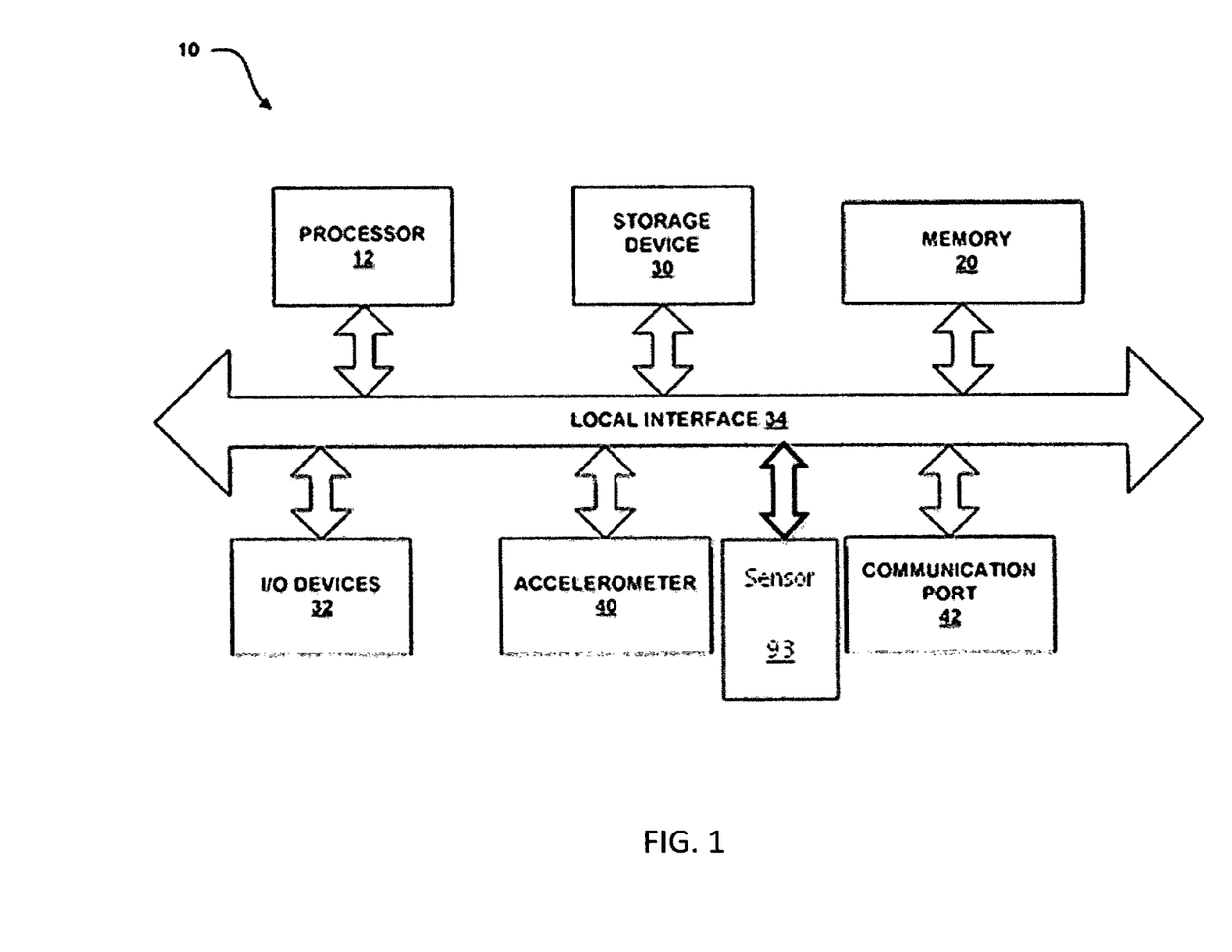
FIG. 1 is a block diagram illustrating an exemplary mobile device for use with exemplary embodiments of the disclosure.

Referring now to FIG. 1, a block diagram illustrating a mobile device 10 for use with exemplary embodiments of the disclosure is shown. The mobile device includes a processor 12, a storage device 30, a memory 20, one or more input/output (I/O) devices 32, an accelerometer 40, one or more sensors 93 and a communications port 42, which are coupled via a local interface 34. In exemplary embodiments, the processor 12 is a hardware device for executing software, particularly that stored in the memory 20. The processor 12 can be any custom made or commercially available processor, a central processing unit (CPU), an auxiliary processor among several processors associated with the mobile device, a semiconductor based microprocessor (in the form of a microchip or chip set), or generally any device for executing software instructions. In exemplary embodiments, the memory 20 can include any one or combination of volatile memory elements, e.g., random access memory (RAM, such as DRAM, SRAM, SDRAM, etc.) and nonvolatile memory elements (e.g., ROM, hard drive, tape, CDROM, etc.). The storage device 30 may incorporate electronic, magnetic, optical, and/or other types of storage media.

In exemplary embodiments, the I/O devices 32 may include input devices, for example but not limited to, a touch screen, a keyboard, mouse, scanner, microphone, or other input device. Furthermore, the I/O devices 32 may also include output devices, for example but not limited to, a display, or other output devices. The I/O devices 32 may further include devices that communicate via both inputs and outputs, for instance but not limited to, a modulator/demodulator, a radio frequency (RF), wireless, or other transceiver, a telephonic interface, a bridge, a router, or other devices that function both as a input and an output. I/O devices are used to transmit data from the vehicle to the central server. In exemplary embodiments, when the mobile device 10 is in operation, the processor 12 is configured to execute the software stored within the memory 20, to communicate data to and from the memory 20, and to generally control operations of the mobile device 10 pursuant to the software. The software and the O/S, in whole or in part, but typically the latter, are read by the processor 12 and then executed. Functionality of the mobile device 10 can be implemented in software, firmware, hardware, or a combination thereof. In an embodiment, a portion of the mobile device is implemented in software, as an executable program, and is executed by a special or general-purpose digital computer.

The mobile device 10 includes an accelerometer 40 for sensing acceleration of the mobile device. The accelerometer 40 is capable of detecting acceleration and deceleration of a vehicle in which the mobile device is positioned. In exemplary embodiments, the accelerometer 40 may be configured to provide acceleration data in three dimensions relative to the orientation of the mobile device. In addition, the accelerometer 40 may be capable of being sampled at a configurable rate. In exemplary embodiments, the sensors 93 may include a gyroscope for sensing the orientation of the mobile device. The gyroscope is capable of detecting rotation movements of a vehicle in which the mobile device is positioned.

In exemplary embodiments, the sensors 93 of the mobile device 10 may include a Global Positioning System (GPS) sensor. The mobile device 10 may be configured to activate the GPS sensor and calculate the latitude, longitude, heading and speed of the mobile device based upon the received GPS data. In exemplary embodiments, the mobile device 10 may be configured to use assisted GPS and or differential GPS techniques to determine the latitude, longitude, heading and speed of the mobile device 10.

In exemplary embodiments, the communication port 42 allows communication between the mobile device and one of many different devices. As an example, the communication port is capable of allowing the mobile device to communicate with the OBD or OBDII connection port of a vehicle. As a result, the communication port is capable of communication via one or more of many different communication protocols. It should be noted that in accordance with the above-described embodiment of the invention, a different means of communication is used for communication with the OBD or OBDII than for communication with the central server. While this is the case, one having ordinary skill in the art will appreciate that in accordance with an alternative embodiment of the invention, a similar means of communication may be used for both communications with a vehicle and with the central server.

Figure 2:
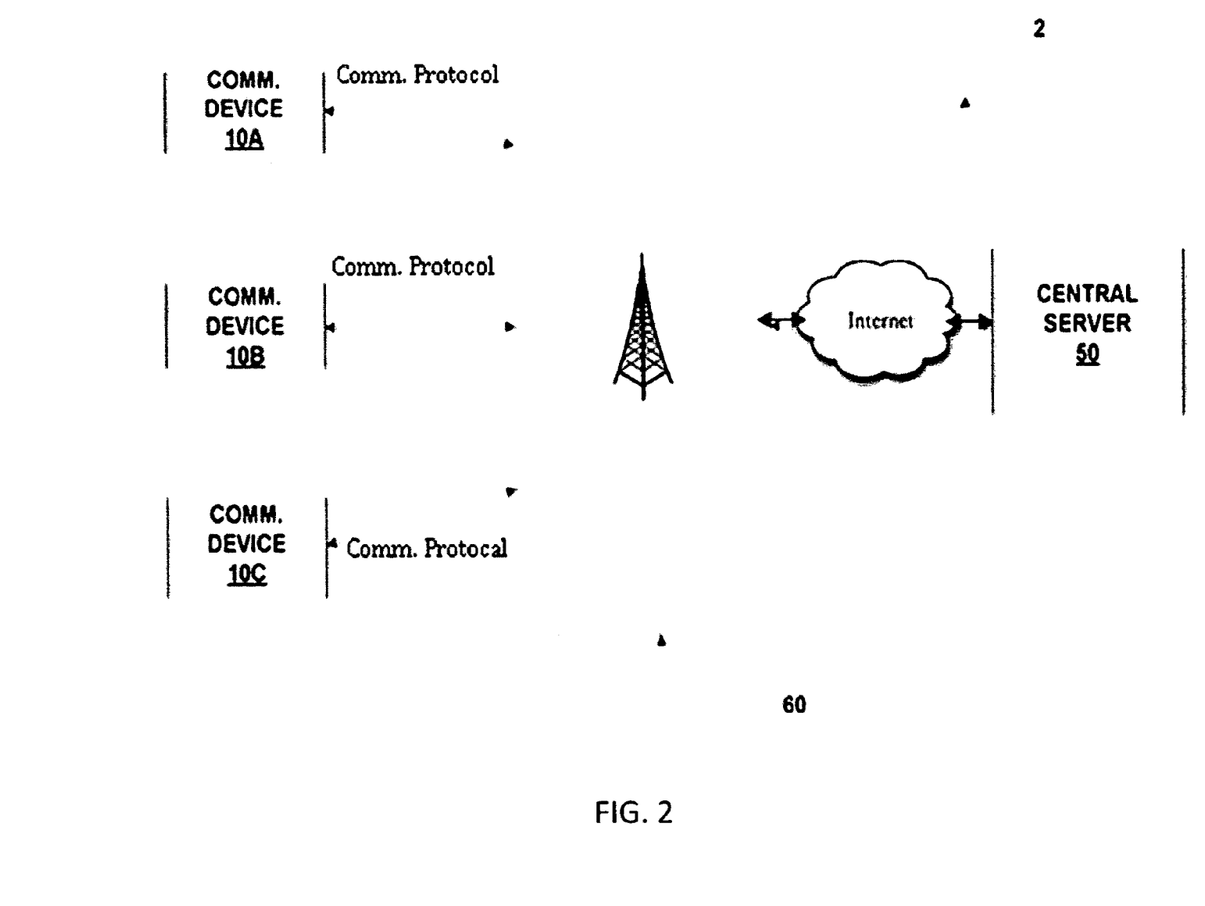
FIG. 2 is a block diagram illustrating an exemplary communications network for use with the mobile device of FIG. 1.

Referring now to FIG. 2, a block diagram illustrating an exemplary mobile communications network 2 is shown. The mobile communications network 2 includes a plurality of mobile devices 10A-10C, which are in communication with a network 60. The network is coupled to a central server 50 via the Internet. In exemplary embodiments, each of the mobile devices 10A-10C may communicate with the central server 50 via use of one or more communication protocol provided by a transmission means, which is known to one having ordinary skill in the art. As a non-limiting example, the mobile device may communicate with the central server via the Internet, through wireless communication, mobile telephone networks, local wireless networks, or through a different communication means. It should be noted that, within the network, communication may be from mobile devices to the central server or from the central server to one or more of the mobile devices. In addition, communication may be from mobile device to mobile device.

Figure 3:
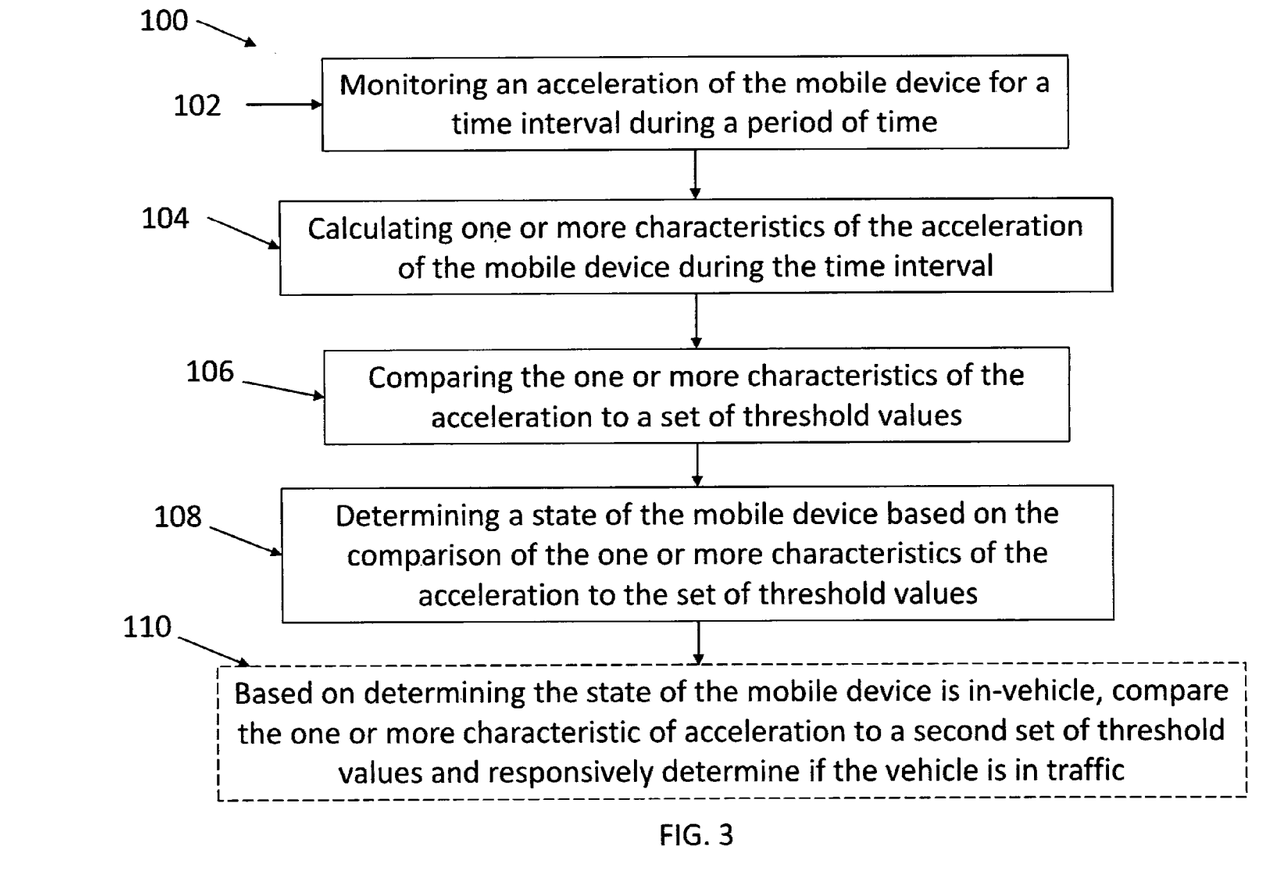
FIG. 3 is a flowchart illustrating an exemplary method for determining the state of a mobile device.

Referring now to FIG. 3, a flowchart illustrating an exemplary method 100 for determining if a mobile device is in a vehicle is shown. As shown at block 102, the method 100 begins with monitoring an acceleration of the mobile device for a time interval during a period of time. In exemplary embodiments, the time interval is a portion of a time period during which the acceleration information for the mobile device is monitored and recorded. For example, the time interval may be ten seconds out of a time period of one minute. In exemplary embodiments, the relative duration of the time interval to the time period may be optimized to minimize power consumption of the mobile device to account for the battery usage of the accelerometer. In exemplary embodiments, the relative duration of the time interval to the time period may be adjusted based on the determined state of the mobile device. For example, if the mobile device is determined to be in a vehicle, the relative duration of the time interval to the time period may be increased to provide a more accurate sensing of a traffic condition. In another example, if the mobile device is determined to be stationary, the relative duration of the time interval to the time period may be decreased to provide better battery life.

Next, as shown at block 104, the method 100 includes calculating one or more characteristics of the acceleration of the mobile device during the time interval. In exemplary embodiments, the one or more characteristics of the acceleration may include a mean acceleration, a standard deviation of acceleration, a minimum acceleration, a maximum acceleration or the like. In addition, in exemplary embodiments, the acceleration data monitored and characteristics of the acceleration calculated may include acceleration data in three dimensions and the characteristics may be calculated separately for each dimension or across the three dimensions. For example, if the acceleration data includes data in three dimensions, the mean acceleration may be calculated to be a single variable which includes the monitored acceleration data across all three dimensions. In another example, if the acceleration data includes data in three dimensions, the mean acceleration may be calculated to include three variables which represent the monitored acceleration data in each of the three dimensions. In exemplary embodiments, the one or more characteristics of the acceleration may include a rotation of the mobile device, which can be calculated from the change in the three dimensional acceleration data. In other exemplary embodiments, the rotation of the mobile device may be received from a sensor such as a gyroscope.

As illustrated at block 106, the method also includes comparing the one or more characteristics of the acceleration to a set of threshold values. In exemplary embodiments, the set of threshold values may include, but are not limited to, one or more mean accelerations, one or more standard deviations of the acceleration, and one or more maximum accelerations and one or more minimum accelerations, or the like. Next, as shown at block 108, the method 100 includes determining a state of the mobile device based on the comparison of the one or more characteristics of the acceleration to the set of threshold values. In exemplary embodiments, the state of the mobile device can include a stationary state and an in-motion state (also referred to as a non-vehicle state), which is indicative of the device being in motion but not in a vehicle (i.e., that the user of the mobile device is walking, running, or the like). In addition, the state of the mobile device can further include an in-vehicle state which is indicative of the device being in a vehicle. In exemplary embodiments, during the stationary state the acceleration data indicates that mobile device is not moving; during the in-motion state the acceleration data indicates that mobile device is likely moving but not in a vehicle; and during the in-vehicle state the acceleration data indicates that mobile device is likely inside a vehicle.

Figure 4:
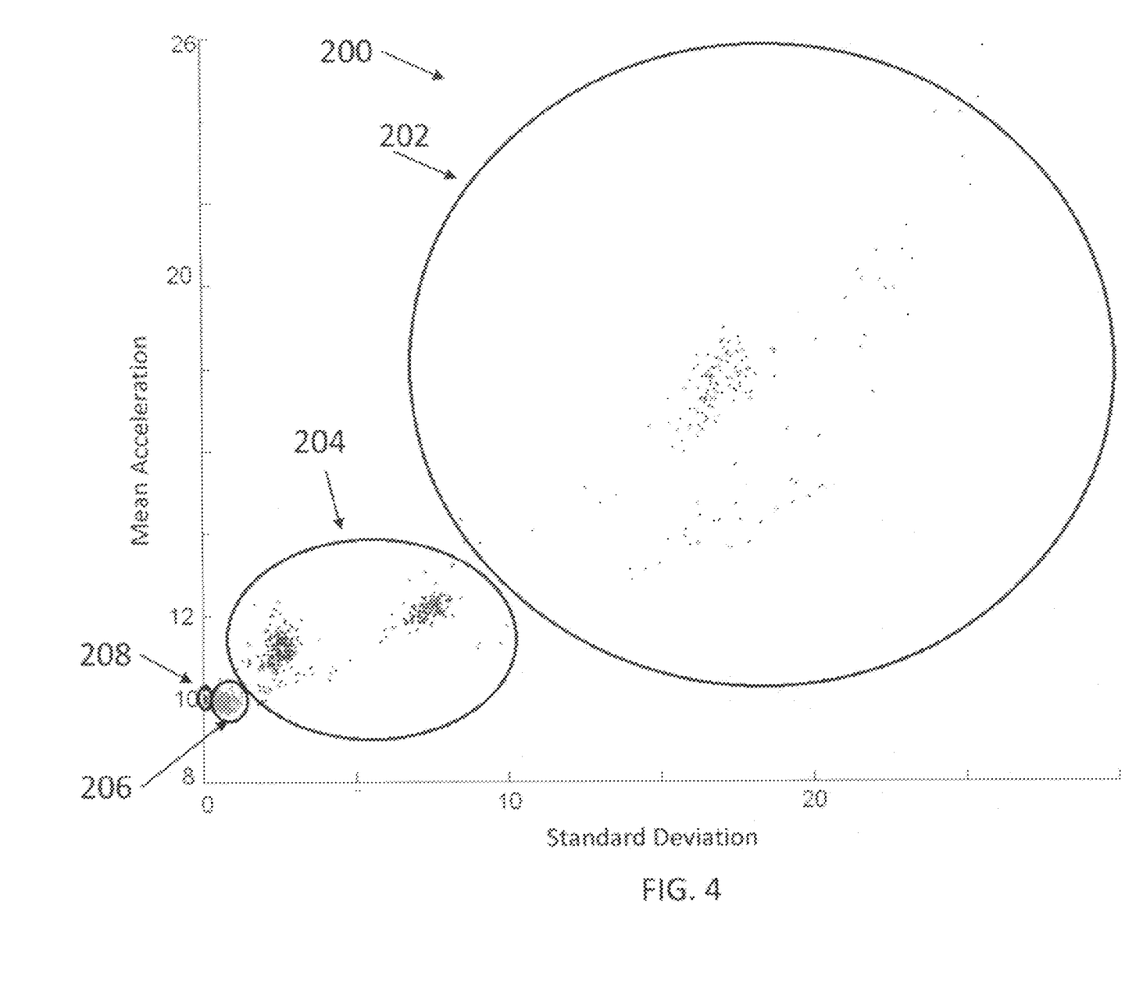
FIG. 4 is a graph illustrating the correlation of a mean acceleration of a mobile device to the standard deviation of acceleration of the mobile device.

Referring now to FIG. 4, a graph 200 depicting the mean acceleration during a time interval and standard deviation of acceleration during a time interval is shown. As illustrated, the graph includes several regions that represent the set of threshold values which each correlate to a mobile device state. As illustrated, region 202 is indicative of the mobile device being in an in-motion (e.g., running) state because the mobile device is experiencing both high mean acceleration and a high standard deviation of acceleration. As illustrated, region 204 is indicative of the mobile device being in an in-motion (e.g., walking) state because the mobile device is experiencing both moderate mean acceleration and a moderate standard deviation of acceleration. As illustrated, region 206 is indicative of the mobile device being in an in-vehicle state because the mobile device is experiencing low mean acceleration and a low standard deviation of acceleration. As illustrated, region 208 is indicative of the mobile device being in a stationary state because the mobile device is experiencing both low mean acceleration (i.e., gravity) and a negligible standard deviation of acceleration. Once the mobile device calculates the characteristics of the acceleration information it compares the characteristics to the set of threshold values represented by the regions. Based upon the comparison of the calculated characteristics of the acceleration to the set of threshold values, the state of the mobile device can be determined.

Figure 5:
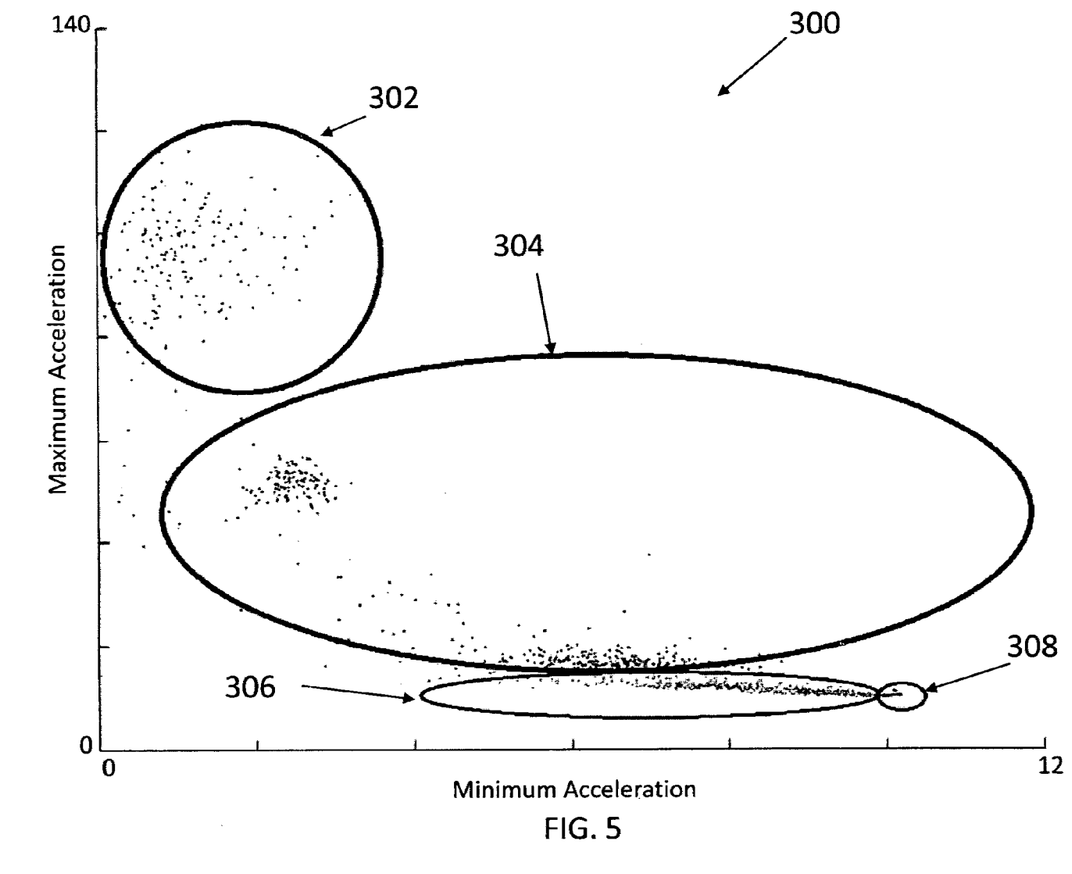
FIG. 5 is a graph illustrating the correlation of the max acceleration of a mobile device to the minimum acceleration of the mobile device.

Referring now to FIG. 5, a graph 300 depicting the maximum acceleration during a time interval and minimum acceleration during a time interval is shown. As illustrated, the graph includes several regions that represent the set of threshold values which correlate to various mobile device states. As illustrated, region 302 is indicative of the mobile device being in an in-motion (e.g., running) state because the mobile device is experiencing high maximum acceleration and a low minimum of acceleration. As illustrated, region 304 is indicative of the mobile device being in an in-motion (e.g., walking) state because the mobile device is experiencing both moderate high maximum acceleration and a moderate minimum of acceleration. As illustrated, region 306 is indicative of the mobile device being in an in-vehicle state because the mobile device is experiencing low maximum acceleration and a moderate to high minimum of acceleration. As illustrated, region 308 is indicative of the mobile device being in a stationary state because the mobile device is experiencing low maximum acceleration and a high minimum of acceleration (again due to gravity). Once, the mobile device calculates the characteristics of the acceleration information it compares the characteristics to the set of threshold values represented by the regions 202. Based upon the comparison of the calculated characteristics of the acceleration to the set of threshold values, the state of the mobile device can be determined.

Figure 6:
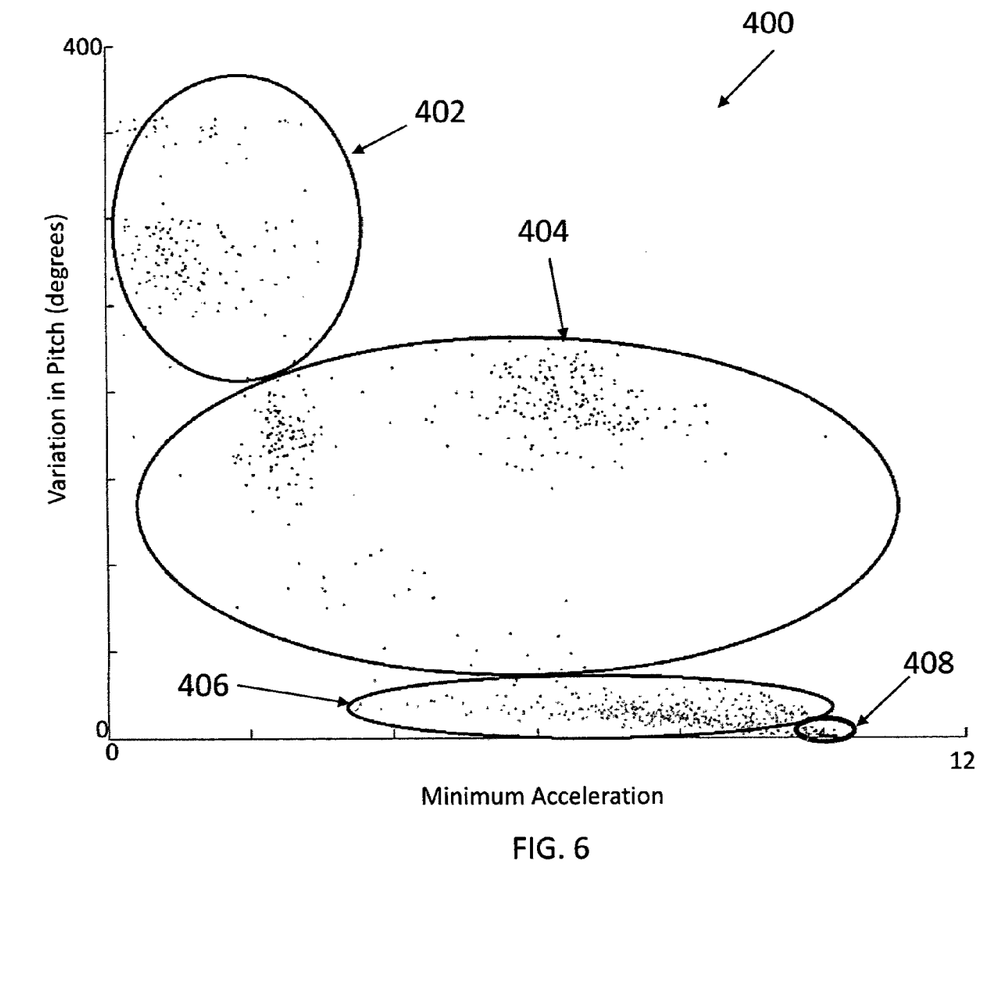
FIG. 6 is a graph illustrating the correlation of the rotation of a mobile device to the minimum acceleration of the mobile device.

Referring now to FIG. 6, a graph depicting the standard deviation of rotation during a time interval and minimum acceleration during a time interval is shown. As illustrated, the graph includes several regions that represent the set of threshold values which correlate to various mobile device states. As illustrated, region 402 is indicative of the mobile device being in an in-motion (e.g., running) state because the mobile device is experiencing high variation in pitch (i.e., rotation) and a low minimum of acceleration. As illustrated, region 404 is indicative of the mobile device being in an in-motion (e.g., walking) state because the mobile device is experiencing moderate variation in pitch and a moderate minimum of acceleration. As illustrated, region 406 is indicative of the mobile device being in an in-vehicle state because the mobile device is experiencing low variation in pitch and a moderate to high minimum of acceleration. As illustrated, region 408 is indicative of the mobile device being in a stationary state because the mobile device is experiencing low variation in pitch and a high minimum of acceleration (again due to gravity). Once, the mobile device calculates the characteristics of the acceleration information it compares the characteristics to the set of threshold values represented by the regions. Based upon the comparison of the calculated characteristics of the acceleration to the set of threshold values, the state of the mobile device can be determined.

In addition to the examples shown in FIGS. 4-6, the mobile device can use various other acceleration information metrics and other sensor data to help determine the state of the mobile device. In exemplary embodiments, the mobile device may compare the one or more characteristics of the acceleration information and other sensor data to multiple sets of data associated with each previously defined mobile device state. In exemplary embodiments, the mobile device can set a current mobile device state to the previously defined mobile device state which has the highest overall correlation of the various sets of data or based on a combination, such as a weighted average, across the sets of data. In general, the mobile device can be determined to be in a vehicle when the mobile device is accelerating and not rotating. More specifically, the mobile device is accelerating above a minimum threshold and below a maximum threshold, and rotating below a maximum threshold.

In exemplary embodiments, once the state of the mobile device is determined to be in-vehicle, the mobile device can be configured to activate its GPS sensor periodically to determine its location, heading and speed. In addition, if desired, one or more features of the phone may be limited, such as the ability to compose a text or email. In exemplary embodiments, the mobile device may also use the battery level to determine if, and how frequently, the GPS sensor will be used. Since using the GPS sensor requires substantial energy, the GPS sensor may not be used during in-vehicle state at all if the battery level of the mobile device is below a minimum value, for example twenty percent of battery life remaining.

In exemplary embodiments, once the state of the mobile device is determined to be in-vehicle, the mobile device may increase the duration of the time interval during a period of time. For example, once a mobile device is determined to be inside of a vehicle, the mobile device may increase the percentage of time that it is monitoring the acceleration data of the mobile device to be better able to determine if the vehicle is in traffic. For example, if during a stationary state the time interval is set to be approximately ten percent of the time period, once the mobile device is determined to be in a vehicle, the time interval may be set to fifty percent of the time period. In exemplary embodiments, the sampling rate of the accelerometer may also be increased once the mobile device is determined to be in an in-vehicle state.

In exemplary embodiments, once the mobile device is determined to be in a vehicle, the mobile device may compare the one or more characteristic of acceleration to a second set of threshold values and responsively determine if the vehicle is in traffic, as illustrated in block 110 of FIG. 3. In exemplary embodiments, the second set of threshold values may be characterized in graphs similar to those shown in FIGS. 4-6.

In exemplary embodiments, once the mobile device is determined to be in an in-vehicle state it will remain in the in-vehicle state until a non-vehicle state is detected. Accordingly, once the mobile device is determined to be in an in-vehicle state, if the mobile device is determined to be stationary, it will remain in an in-vehicle state. This particular condition will be indicative of the mobile device being in a vehicle that is stationary. Accordingly, the in-vehicle state can be divided into a stationary vehicle state and a moving vehicle state. By monitoring the transitions from the moving vehicle state to the stationary vehicle state a determination that the mobile device is likely in a vehicle that is in traffic can be made and the device state can be updated to a traffic state. In exemplary embodiments, the mobile device may be configured to activate a GPS sensor to calculate the speed and location of the mobile device and to use the calculated speed data to verify that the mobile device is in fact in a vehicle that is in traffic, prior to changing the state of the mobile device to a traffic state.

In exemplary embodiments, once the state of the mobile device is determined to be in a vehicle in traffic the mobile device is responsively set to a traffic state. During the traffic state, the mobile device may activate the GPS sensor with a greater frequency than while in vehicle state and the mobile device may be configured to report its location and speed to a traffic management system. In exemplary embodiments, the mobile device may be configured to automatically launch a navigation application during traffic state to alert the user to the severity of the traffic and provide the user with an option of re-routing around the traffic.

In exemplary embodiments, the mobile device may be configured to take specific actions when the state of the mobile device changes. One common state change will occur after the current state of the mobile device is set to an in-vehicle state. In this case, the next state of the mobile device will either be a traffic state or in an in-motion state. The in-motion state will occur once the user exits the motor vehicle and begins walking or running. Another common state change is the change from an in-motion state to a stationary state; that is, once the user of the mobile device stops walking and becomes stationary. In exemplary embodiments, the mobile device may be configured to activate the GPS sensor each time a change in the state of the mobile device occurs and to update a stored current location of the mobile device.

Tracking a user's movements based on the motion of a mobile device can be used to provide insight into the user's context. Understanding when a user has entered a vehicle, exited a vehicle, is walking, is running, is moving in some other way or has stopped can be used to provide insight into activities of the user. For example, based on how long a user is outside a vehicle and stopped indicates the timeframe the individual is in a fixed location. User tracking applications, like social networking applications and loyalty programs, that would like to know the timeframe a user is at a particular location can benefit through user updates. One example of a social networking application is Foursquare™. Because users may not manually check-in to locations, much less upon every occurrence of the user visiting the location, a need exists for an accurate, low-battery power consuming automated check-in solution.

Activating GPS or another location based technology like Wifi positioning based on accelerometer and/or gyroscope movements can provide the needed accurate, low-battery power consuming automated check-in solution. Based on the change in user context identified through accelerometer data, the location technology can be activated and the time and location can be used to update the user tracking application. One example of a user tracking application is Google Latitude™. In exemplary embodiments, various methods can be used to accurately determine the context of a user based on the detected motion of the mobile device. For example, one method may include monitoring the state of a mobile device and after the mobile device remains in a stationary state for a fixed amount of time before updating the user's location. The fixed amount of time can be used to ensure that the user has arrived at a destination and not temporally stopped and can also be used to prevent an excessively high number of check-ins. In exemplary embodiments, the user may be able to adjust the fixed amount of time that the mobile device must be in the stationary state before auto check-in occurs. In addition, the user may be presented with various options to always, never, or display user prompt for checking-in at specific locations. For example, a user may select to always auto check-in at a favorite restaurant or shop, to never auto check-in at home or at work, and to have the mobile device prompt him before checking-in at unknown or new locations.

In exemplary embodiments, acceleration data may be used in combination with rotation data to determine the state of the mobile device. The rotational data may be received directly from a gyroscope or it may be calculated from the acceleration data received from an accelerometer. By using both rotation and acceleration, it is possible to determine the state of the mobile device with very high accuracy. Using acceleration and rotation data, it is possible to simulate every motion of an object in three dimensional space. Based on a digital simulation, it is possible to associate movements with the state of the mobile device.

In exemplary embodiments, the time required to accurately determine the state of the mobile device may be less than ten seconds. Higher confidence levels can be associated to the state of the device as the time interval of the acceleration of the mobile device is increased. In exemplary embodiments, accurately determining that the mobile device is in an in-vehicle state requires more time than determining that the mobile device is in an in-motion state. In addition, because mobile devices have battery power constraints even a low power algorithm may need to be optimized. Periodically running an algorithm for a period of time (for example 20 seconds every 5 minutes) has tremendous battery power implications. The longer the timeframe this algorithm runs to determine the device state, the more battery power it uses.

During testing, it was observed that running a state identification algorithm as disclosed herein periodically for ten seconds every five minutes versus twenty seconds every five minutes resulted in a difference of more than two percent overall battery power lifespan for a mobile device through the course of a day. Because users use mobile devices heavily, even slight impacts on battery power may have huge implications.

Assuming the device is inside a vehicle, the magnitude of the acceleration may be observed to infer the context of the vehicle. For example, if the acceleration of the device is approximately the acceleration of gravity, it can be inferred with a high degree of certainty that the vehicle is stationary. If the acceleration is substantially more than or less than the acceleration of gravity (again, without rotation) then this implies the vehicle is moving. In another embodiment, if the vehicle oscillates back and forth between stationary and moving for a period of time, this implies a traffic event. The greater the times associated with this back and forth idle and moving states, the greater the intensity of traffic. In another embodiment, if the vehicle is moving for a substantial period of time, it can be inferred that the vehicle is no longer in traffic.

In another embodiment, if the device is left inside the vehicle, then the excessive rotation associated with it leaving that environment will not take place. In such a situation, the device will reflect a stationary vehicle for an excessive period of time. Beyond some reasonable threshold for no movement, then in another embodiment of the invention it can be sufficiently inferred that the vehicle is in fact parked and not in an idle or traffic event.

What is claimed is:

1. A method for determining if a mobile device is in a vehicle comprising:
    monitoring an acceleration of the mobile device for a first time interval during a first period of time, and a rotation of the mobile device for a second time interval during a second period of time;
    calculating one or more characteristics of the acceleration of the mobile device during the first time interval and one or more characteristics of the rotation of the mobile device during the second time interval;
    comparing the one or more characteristics of the acceleration to a first set of threshold values and the one or more characteristics of the rotation to a second set of threshold values; and
    determining a state of the mobile device based on the comparison of the one or more characteristics of the acceleration to the first set of threshold values, and the one or more characteristics of the rotation to the second set of threshold values,
    wherein the state of the mobile device comprises an in-vehicle state if the acceleration is greater than a first minimum threshold and the rotation is less than a first maximum threshold and a non-vehicle state if the acceleration is less than the first minimum threshold or the rotation is greater than the first maximum threshold,
    wherein the one or more characteristics of the acceleration include at least one of mean magnitude, maximum magnitude, minimum magnitude, standard deviation, other statistical metrics, information theoretic metrics, or combinations thereof and the one or more characteristics of the rotation include at least one of mean change in yaw, mean change in pitch, mean change in roll, maximum change in yaw, maximum change in pitch, maximum change in roll, minimum change in yaw, minimum change in pitch, minimum change in roll, standard deviation of the change in yaw, standard deviation of the change in pitch, standard deviation of the change in roll, other statistical metrics of yaw, other statistical metrics of pitch, other statistical metrics of roll, information theoretic metrics of yaw, information theoretic metrics of pitch, information theoretic metrics of roll, or combinations thereof.

2. The method of claim 1, wherein the first time interval is less than ten percent of the first time period or the second time interval is less than ten percent of the second time period.

3. The method of claim 1, further comprising:
    based on determining that the mobile device is in the in-vehicle state, increasing the first time interval during the first period of time or the second time interval during the second period of time.

4. The method of claim 1, further comprising:
    based on determining that the mobile device is in the in-vehicle state, increasing a sampling rate for monitoring the acceleration of the mobile device or a sampling rate for monitoring the rotation of the mobile device.

5. The method of claim 1, further comprising:
    based on determining that the mobile device is in the in-vehicle state, activating a GPS sensor and calculating a location and speed of the mobile device.

6. The method of claim 1, further comprising:
    based on determining that the mobile device is in the in-vehicle state:
    continuously monitoring the acceleration of the mobile device during a third period of time;
    calculating one or more characteristics of the acceleration of the mobile device during the third period of time;
    comparing the one or more characteristics of the acceleration to a third set of threshold values; and
    determining the state of a vehicle based on the comparison of the one or more characteristics of the acceleration to the third set of threshold values, wherein the state of the vehicle comprises a traffic state.

7. The method of claim 6, further comprising:
    based on determining that the vehicle is in the traffic state, activating a GPS sensor and calculating the location and speed of the mobile device and transmitting a traffic alert message.

8. The method of claim 7, wherein the traffic alert message includes a latitude, a longitude, a heading, and the speed of the vehicle.

9. The method of claim 1, further comprising:
    monitoring the rotation of the mobile device with an accelerometer or a gyroscope.

10. The method of claim 1, further comprising the in-vehicle state if the acceleration is less than a second maximum threshold and the non-vehicle state if the acceleration is greater than the second maximum threshold.

11. The method of claim 1, further comprising the in-vehicle state if the rotation is greater than a second minimum threshold and the non-vehicle state if the rotation is less than the second minimum threshold.

12. A method for determining a location of a user associated with a mobile device comprising:
    monitoring an acceleration of the mobile device for a first time interval during a first period of time, and a rotation of the mobile device for a second time interval during a second period of time;
    calculating one or more characteristics of the acceleration of the mobile device during the first time interval and one or more characteristics of the rotation of the mobile device during the second time interval;

comparing the one or more characteristics of the acceleration to a first set of threshold values and the one or more characteristics of the rotation to a second set of threshold values; and determining a state of the mobile device based on the comparison of the one or more characteristics of the acceleration to the first set of threshold values, and the one or more characteristics of the rotation to the second set of threshold values, wherein the state of the mobile device comprises an in-motion state if the rotation is greater than a first maximum threshold, an in-vehicle state if the acceleration is greater than a first minimum threshold and the rotation is less than the first maximum threshold, and a stationary state if the acceleration is less than the first minimum threshold and the rotation is less than the first maximum threshold, wherein the one or more characteristics of the acceleration include at least one of mean magnitude, maximum magnitude, minimum magnitude, standard deviation, other statistical metrics, information theoretic metrics, or combinations thereof and the one or more characteristics of the rotation include at least one of mean change in yaw, mean change in pitch, mean change in roll, maximum change in yaw, maximum change in pitch, maximum change in roll, minimum change in yaw, minimum change in pitch, minimum change in roll, standard deviation of the change in yaw, standard deviation of the change in pitch, standard deviation of the change in roll, other statistical metrics of yaw, other statistical metrics of pitch, other statistical metrics of roll, information theoretic metrics of yaw, information theoretic metrics of pitch, information theoretic metrics of roll, or combinations thereof; and based on determining a change of the state of the mobile device, calculating and updating the location of the mobile device.

13. The method of claim 12, further comprising updating the location of the user in a social networking application to the calculated location of the mobile device.

14. The method of claim 12, further comprising updating the location of a user in a user tracking application to the calculated location of the mobile device.

15. The method of claim 12, wherein calculating of the location of the mobile device includes activating a GPS sensor.

16. The method of claim 12, wherein calculating of the location of the mobile device includes activating a Wifi positioning system.

17. The method of claim 13, wherein the mobile device must be in a stationary state for a fixed amount of time prior to updating the location of the user in the social networking application to the calculated location of the mobile device.

18. The method of claim 14, wherein the mobile device must be in a stationary state for a fixed amount of time prior to updating the location of the user in the user tracking application to the calculated location of the mobile device.

19. The method of claim 12, further comprising the in-motion state if the acceleration is greater than a second maximum threshold and the in-vehicle state if the acceleration is less than the second maximum threshold.

20. The method of claim 12, further comprising the in vehicle state if the rotation is greater than a second minimum threshold and the in-motion state if the rotation is less than the second minimum threshold.

* * * * *